(12) United States Patent
Semmlinger et al.

(10) Patent No.: US 6,457,574 B1
(45) Date of Patent: Oct. 1, 2002

(54) DEVICE FOR HANDLING AT LEAST ONE TENSIONING FRAME, ESPECIALLY FOR MOUNTING VEHICLE SHELLS

(75) Inventors: Wilfried Semmlinger, Königsbrunn; Botho Kikut, Augsburg; Gerhard Kraus, Friedberg; Günther-Eberhard Tauchen, Neusäss, all of (DE)

(73) Assignee: Kuka Schweissanlagen GmbH (DE)

( * ) Notice: Subject to any disclaimer, the term of this patent is extended or adjusted under 35 U.S.C. 154(b) by 0 days.

(21) Appl. No.: 09/673,472

(22) PCT Filed: Apr. 10, 1999

(86) PCT No.: PCT/EP99/02439
§ 371 (c)(1),
(2), (4) Date: Oct. 13, 2000

(87) PCT Pub. No.: WO99/54083
PCT Pub. Date: Oct. 28, 1999

(30) Foreign Application Priority Data

Apr. 16, 1998 (DE) ..................... 298 06 823 U (51) Int. Cl.[7] ................ B65G 43/00; B21D 39/03
(52) U.S. Cl. ................ 198/341.05; 198/465.01; 29/431; 29/824
(58) Field of Search .............. 198/341.05, 341.02, 198/465.1; 29/430, 431, 824, 429, 823, 822

(56) References Cited

U.S. PATENT DOCUMENTS

| 4,453,303 | A | * | 6/1984 | Leddet | 198/341.05 |
|---|---|---|---|---|---|
| 4,723,356 | A | * | 2/1988 | Sakamoto et al. | 198/341.05 |
| 4,924,996 | A | * | 5/1990 | Svensson et al. | 134/123 |
| 5,267,683 | A | | 12/1993 | Hamada et al. | |
| 5,427,300 | A | * | 6/1995 | Quagline | 228/4.1 |

FOREIGN PATENT DOCUMENTS

| DE | 28 10 822 C2 | 9/1978 |
|---|---|---|
| DE | 31 20 218 A1 | 12/1982 |
| DE | 32 30 455 A1 | 12/1983 |
| DE | 36 06 058 C2 | 8/1986 |
| DE | 37 24 329 A1 | 2/1989 |
| DE | 41 00 477 A1 | 7/1991 |
| DE | 92 10 396 | 1/1994 |
| DE | 44 31 384 A1 | 9/1995 |
| EP | 0 734 941 A1 | 10/1996 |
| EP | 0 835 717 A1 | 4/1998 |
| JP | 60-255583 | 12/1985 |
| JP | 1-218983 | 9/1989 |
| JP | 2-193782 | 7/1990 |
| JP | 6-87476 | 3/1994 |
| JP | 08058649 A | 3/1996 |

\* cited by examiner

Primary Examiner—Donald P. Walsh
Assistant Examiner—Kenneth W. Bower
(74) Attorney, Agent, or Firm—McGlew and Tuttle, P.C.

(57) ABSTRACT

The present invention pertains to a handling device (36) for one or more clamping frames (14) for components (3), especially shells of vehicles, in processing stations (1). The handling device (36) has one or more rotatably driven connecting rods (10), which are mounted in a carriage (5) that can be moved by a motor along a transfer line (2) at one of their ends and have a holding device (13) for receiving the clamping frame (14) at their other ends. Two connecting rods (10), which are arranged in two coupled carriages (5) in the manner of a four-bar chain and are rotatable around parallel axes (11), are preferably present. The handling device preferably generates a feed movement of the clamping frames (14) which is essentially linear and is directed at right angles to the transfer line (2).

20 Claims, 6 Drawing Sheets

DEVICE FOR HANDLING AT LEAST ONE TENSIONING FRAME, ESPECIALLY FOR MOUNTING VEHICLE SHELLS

FIELD OF THE INVENTION

The present invention pertains to a device for handling at least one clamping frame with a device for handling one or more clamping frames for components, especially shells of vehicles, in a processing station with a transfer line.

BACKGROUND OF THE INVENTION

It has been known that the floor parts with the loosely guided side parts of a shell can be moved along a transfer line into a processing station and additional individual parts of the shell can be moved into that station by means of clamping frames and be brought into a geometrically correct assembly position, where a local welding of the individual parts takes place.

Such a device must, moreover, be suitable for making available clamping frames for different vehicle models and for bringing these into the working position. This is accomplished by guiding a plurality of clamping frames movably in parallel to the transfer line, where an additional movement of the clamping frames at right angles to the transfer line is necessary in the area of the processing station in order to reach the working or welding station.

A considerable amount of space and a high design and movement technical effort are needed for this in the prior-art devices.

SUMMARY AND OBJECTS OF THE INVENTION

The basic object of the present invention is therefore to develop a special form of handling of clamping frames, which functions in a space- and cost-saving manner and, moreover, guarantees more freedom of movement of the industrial robots arranged in the area of the processing station.

According to the invention, a handling device is provided for handling one or more clamping frames for components, such as shells of vehicles. The device is used in a processing station with a transfer line. The handling device has one or more said rotatably driven connecting rods. The connecting rods are mounted in at least one carriage, which can be moved by a motor along the transfer line, at one of their ends, and have a holding device for receiving the clamping frame at their other end.

The device according to the present invention offers a better and more compact possibility for handling the clamping frames.

In a preferred embodiment, the individual clamping frame is held and guided via a holding device by means of two connecting rods, which are connected to the holding device in the manner of a four-bar chain. These connecting rods are mounted on carriages and are rotatably driven and the said carriages are moved along the transfer line in a controlled manner. Due to the superimposition of the feed movement of the carriages and the pivoting movement of the connecting rods, it is possible to bring about a steering, which moves the holding device and the clamping frames fastened thereto essentially linearly and at right angles to the transfer lines.

Such an arrangement is also suitable for moving the individual clamping frame in parallel to the transfer line and to transfer it into a clamping frame storage unit, while the connecting rods perform an opposite pivoting movement in relation to the approach to the shell.

It proved to be advantageous within the framework of the present invention for the individual clamping frame to be guided movably along and at right angles to the transfer line in its working position on a stationary frame as well as to be centered and braced. It is thus achieved that the carriages and connecting rods needed for the movement of the clamping frames are relieved of the weight of the clamping frame and of the tools fastened thereto in the assembly or welding position and the clamping frame is held in the working position with reproducible accuracy.

A solution alternative is described herein. According to this alternative, the individual connecting rod is designed as an articulated arm in the manner of a toggle lever. Another pivoting drive for the free leg of the articulated arm is located in the toggle link. The individual connecting rod thus has two pivoting devices, which are controlled such that the holding device articulated to the free leg performs a linear movement at right angles to the transfer line.

In this embodiment variant, which has the character of an independent invention, the pivoting movements are coordinated with one another by two pivoting drives, so that the lifting movement of the carriages, which are movable along the transfer line, is not important.

In another independent embodiment for accomplishing the object of the present invention, only one connecting rod is needed for each clamping frame, and this connecting rod acts on the center of the holding device in an articulated manner and with a pivoting drive. The other end of the connecting rod is displaceable in a stationary guide by means of a carriage, wherein the resultant of the carriage guiding and of the pivotability of the holding device in relation to the connecting rod causes the holding device to move from a basic position that is parallel to the transfer line into a parked position extending obliquely thereto, where a transfer into a laterally arranged clamping frame storage unit can take place from the parked position. A carriage guide in parallel to the transfer line can be dispensed with in the case of such an arrangement.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
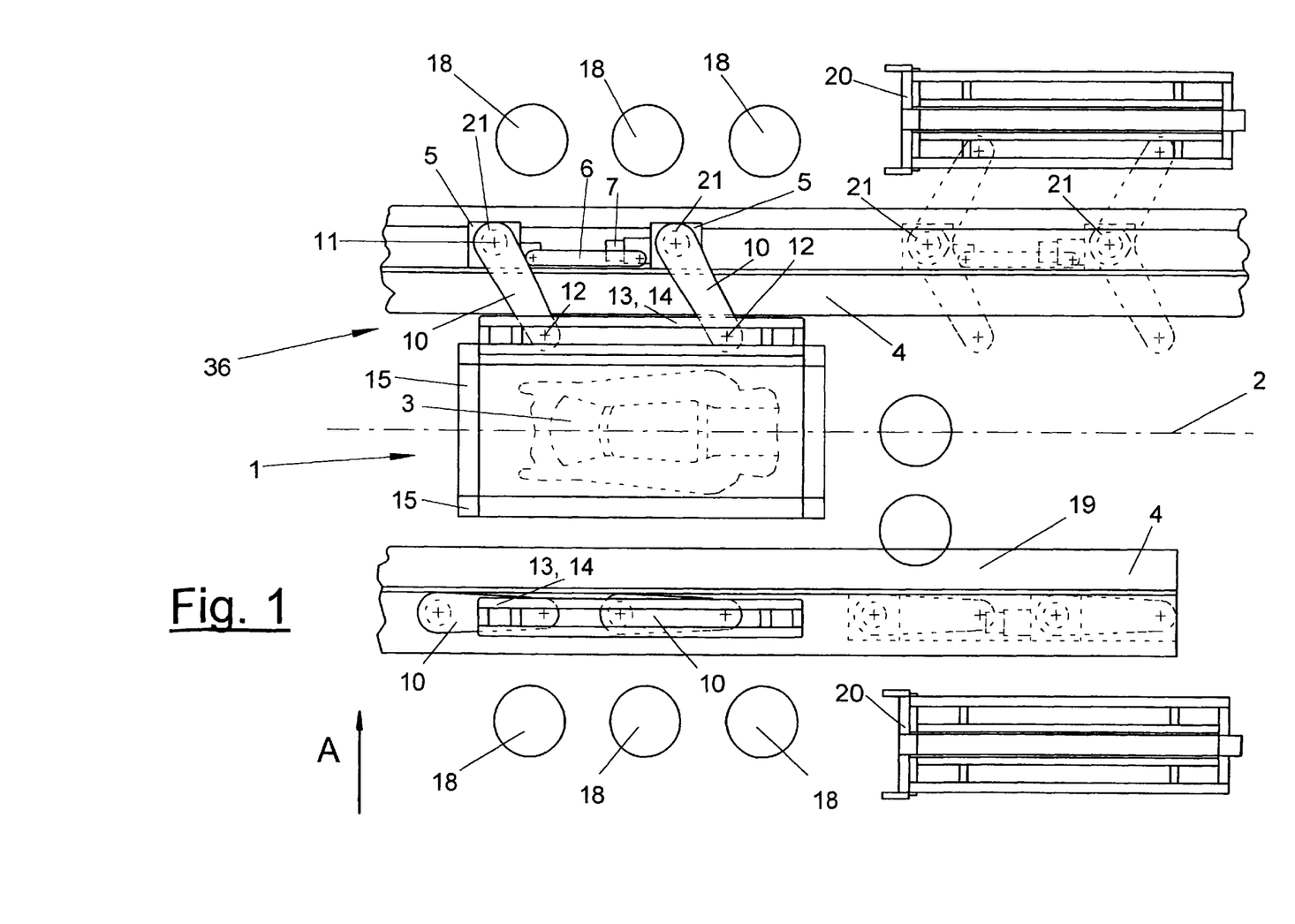
FIG. 1 is a top view of a transfer line with a processing station and guides arranged in parallel thereto for clamping frames.
Figure 2:
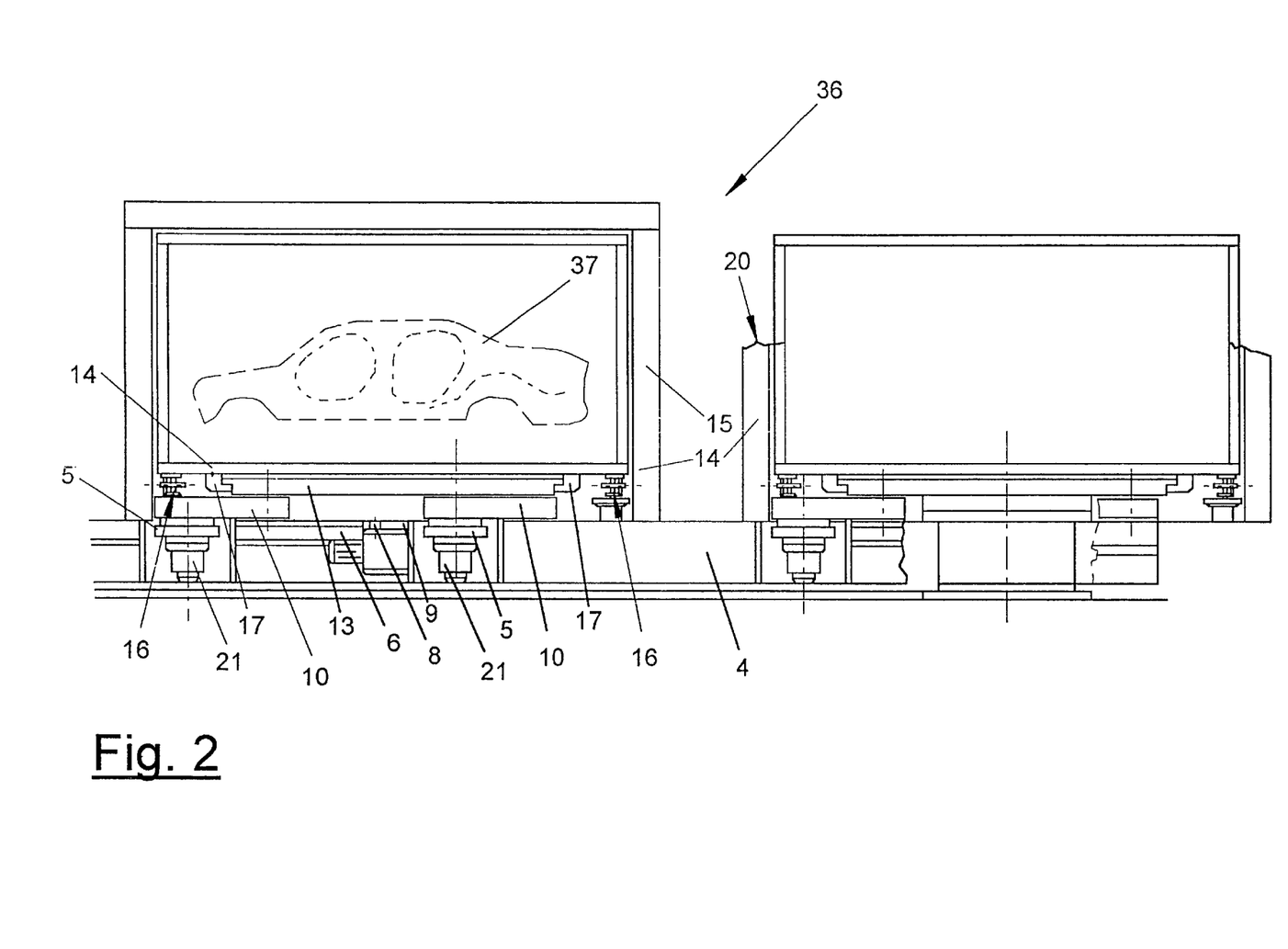
FIG. 2 is a side view of the arrangement according to FIG. 1 in the direction of the arrow A of FIG. 1.
Figure 3:
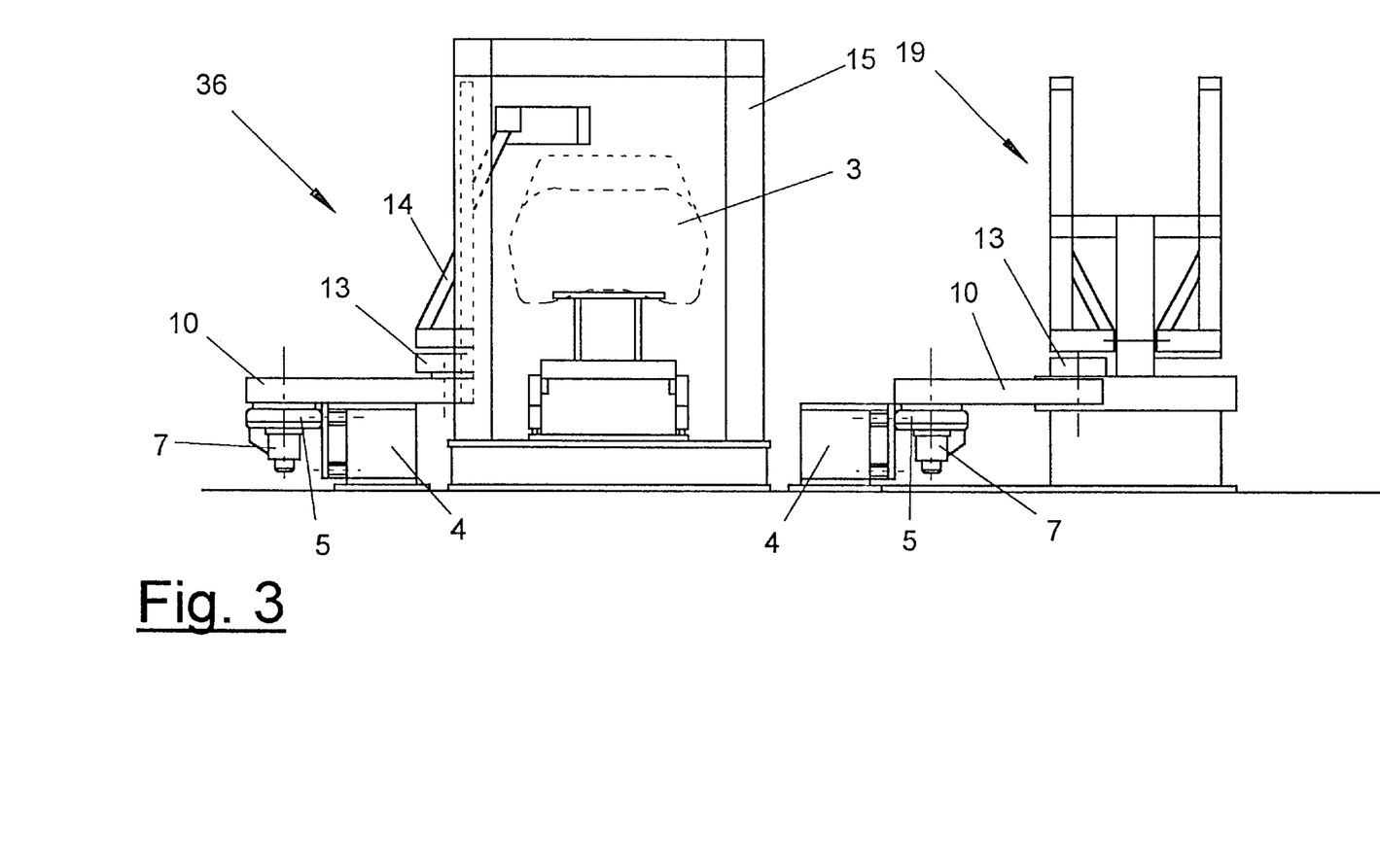
FIG. 3 is a front view of the processing station with a guide arranged laterally therefrom for clamping frames.

Referring to the drawings in particular, a processing station 1 with a transfer line 2 is symbolically shown in the exemplary embodiment according to FIGS. 1 through 3. An initial component 3, e.g., the shell of a vehicle, is located in the processing station 1, and one or more additional workpieces 37, preferably side parts, can be brought into a reproducible, geometrically defined position in relation to the shell 3. The processing station 1 has a handling device 36, which can feed one or more clamping frames 14 laterally to the shaft 3. In the preferred exemplary embodiment, the clamping frames 14 are loaded with the side parts 37, which are, e.g., shown schematically in FIG. 2 and are indicated by broken lines. As an alternative, the clamping frames 14 may also be empty and offer only a clamping and processing function for the shell 3, which is already equipped with the side parts or other workpieces in advance in this case.

The handling device 36 has at least one displaceable and rotatable connecting rod 10, 22, 30 with a holding device 13 for the clamping frame 14. Various embodiments will be described for this below.

A guide 4, on which one or more carriages 5 are guided movably in parallel to the transfer line 2, is located in parallel to the transfer line 2 next to the processing station 1 on each side. FIG. 3 shows that these carriages 5 are mounted movably and cantilevered, e.g., on the outside of the box-like guide 4.

According to FIG. 1, a connecting rod 10 is mounted rotatably along a vertical pivot axis 11 on each carriage 5 and is adjustable by means of a pivoting drive 21. The carriages 5, which are at spaced locations from one another, are preferably connected to one another by a coupling rod 6 and move synchronously. At least one of the carriages 5 has a feed drive 7, which forcibly moves the carriage and thus the other carriage and the connecting rods 10 along the guide 4. As is apparent from FIG. 2, the feed drive 7 acts on a toothed rack 9 located stationarily on the guide 4 via a pinion 8.

At least one holding device 13 is arranged in an articulated manner in the area of the axes 12 at the free ends of the connecting rods 10. The individual holding device 13 may have any desired, suitable design and has, e.g., a holding bar. The holding device 13 carries an upright clamping frame 14, as is apparent especially from FIGS. 2 and 3. One or more clamping or centering units for the workpieces or side parts 37 are fastened on the clamping frame 14 in the conventional manner in order to bring these to the shell 3 into a geometrically defined position.

The holding device 13 can be moved with the clamping frames 14 fastened thereto preferably essentially linearly and at right angles to the transfer line 2 in order to avoid collisions. To achieve this, the pivoting movement of the pivoting drives 21 and the feed movement of the feed drive 7 are coordinated with one another such that this linear transverse movement of the clamping frame 14 is obtained as the resultant.

As is shown in FIGS. 2 and 3, the connecting rods 10, the holding device 13 and the guide 4 with the carriages 5 are located under the contour of the shell 3. The purpose of this is not to hinder the mobility of the industrial robots 18 arranged on the side of the guides 4. The consequence of this is that the load of the holding device 13, of the clamping frame 14 and of the workpieces lies fully on the connecting rods 10, which take up loads cantilevered around vertical axes. To guarantee the reliable association of the individual parts of the shell 3, the individual clamping frames 14 are connected to a stationary frame 15. Longitudinal and cross guides 16 are arranged for this purpose between the frame 15 and the clamping frame 14 in order to bring about the end position of the clamping frame at the frame 15. FIG. 2 also shows that one or more clamping connections 17 are provided between the clamping frame 14 and the holding device 13, which guarantees the fastening of the clamping frame 14 on the holding device 13 during the transport along the guide 4.

The exemplary embodiment in FIG. 1 also shows how the connecting rods 10 can be actuated in order to move the individual clamping frame 14 from the processing station into a waiting position 19 or into a clamping frame storage unit 20. Provisions are made for this purpose to arrange the connecting rods 10 in a position in parallel to the transfer line 2. The clamping frames 14 are thus movable along the guide 4 without projecting beyond the guide 4 laterally. If the carriage-connecting rod arrangement 5, 10 has arrived in the waiting position 19, this unit can stay there if a second, equivalent unit is introduced from another waiting position into the processing station 1.

However, it is also possible to bring the clamping frame 14 located in the waiting position 19 into a clamping frame storage unit 20, for which purpose a pivoting movement of the connecting rods 10 in the opposite direction is necessary in conjunction with a controlled movement of the carriages 5. Such a movement is indicated in the top right part of FIG. 1.

Figure 4:
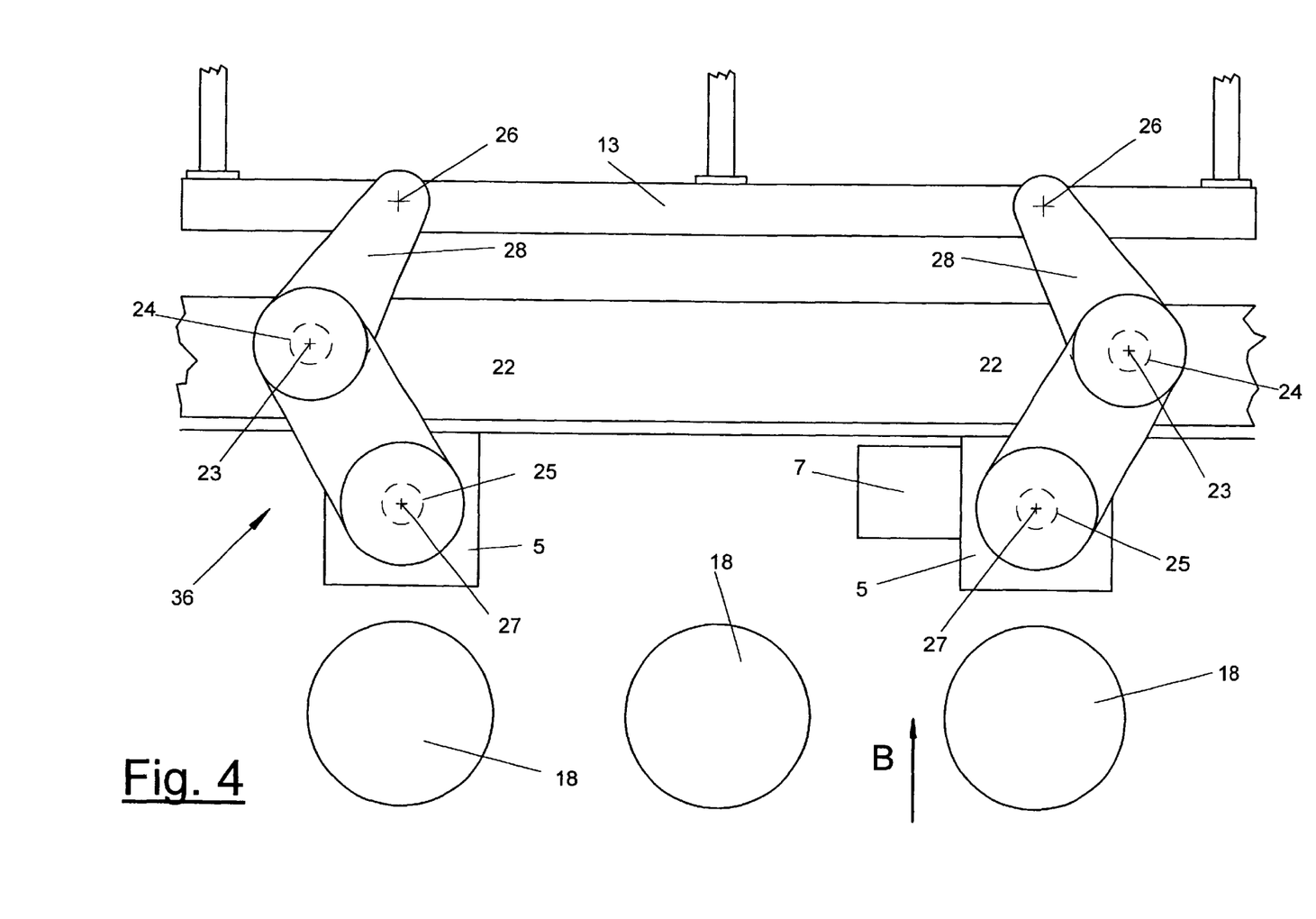
FIG. 4 is a top view of an arrangement for moving clamping frames by means of articulated arms.
Figure 5:
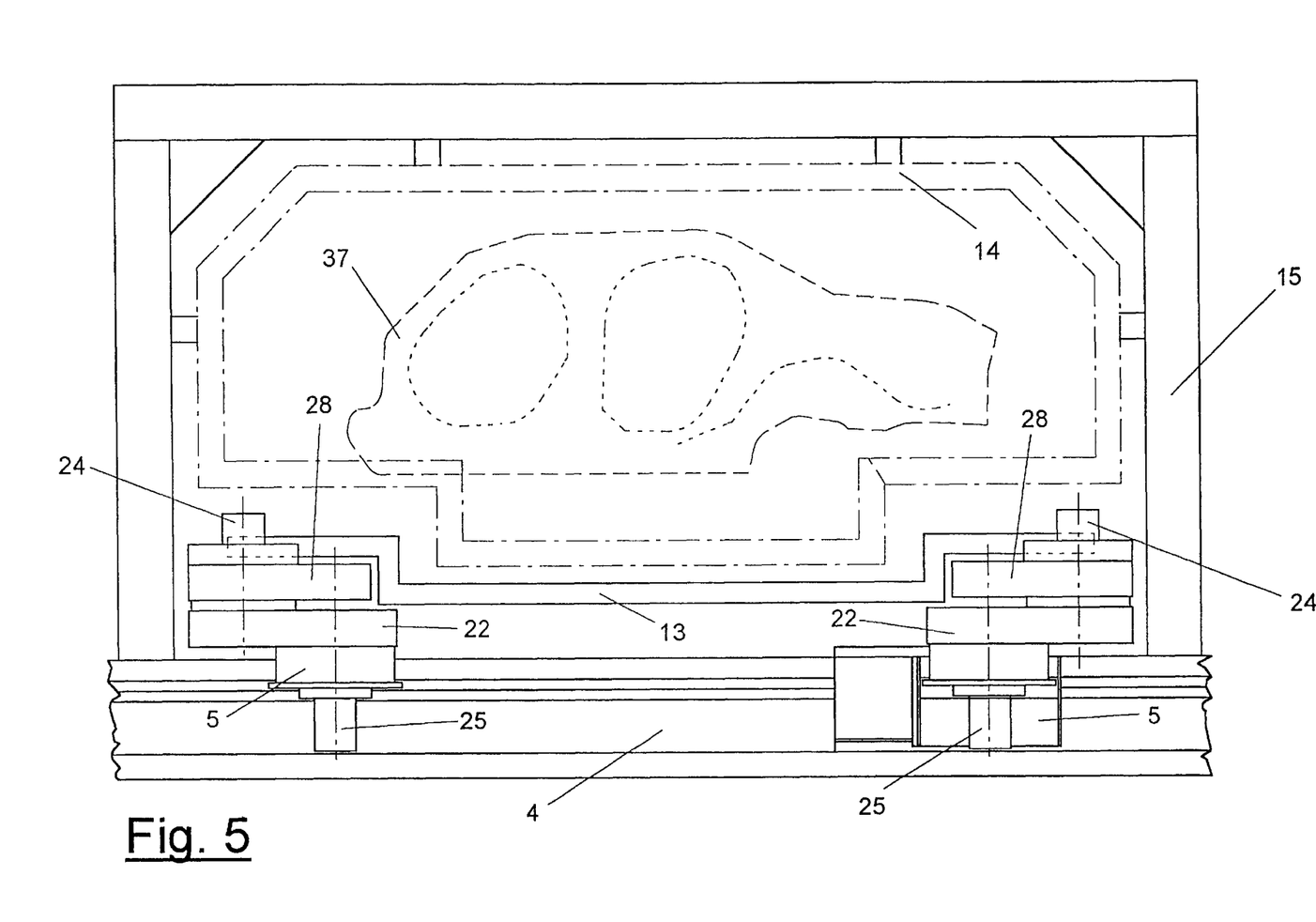
FIG. 5 is a side view of the arrangement according to FIG. 4 in the direction of arrow B.

An independent inventive variant of the embodiment according to FIGS. 1 through 3 is shown in the examples according to FIGS. 4 and 5.

According to this variant, the individual holding device 13 is held and guided by two articulated arms 22, and an additional pivoting drive 24 for the pivoting movement of the free leg 28 is provided in the area of the toggle link 23. The linear displacement of the holding device 13 at right angles to the transfer line 2 is thus brought about by the superimposition of the pivoting movements of the pivoting drives 24 and 27, so that a linear transverse movement of the holding device 13 will result. The free leg 28 of the articulated arm 22 is connected to the holding device 13 via the axis 26. The other axis 27 of the articulated arm 22 is mounted and driven rotatably via the pivoting drive 25 on a carriage 5, which is adjustable in parallel to the transfer line 2 along a guide 4 in order to transfer the holding device 13 and the clamping frame 14 fastened thereto from the processing station into a waiting station or vice versa.

Figure 6:
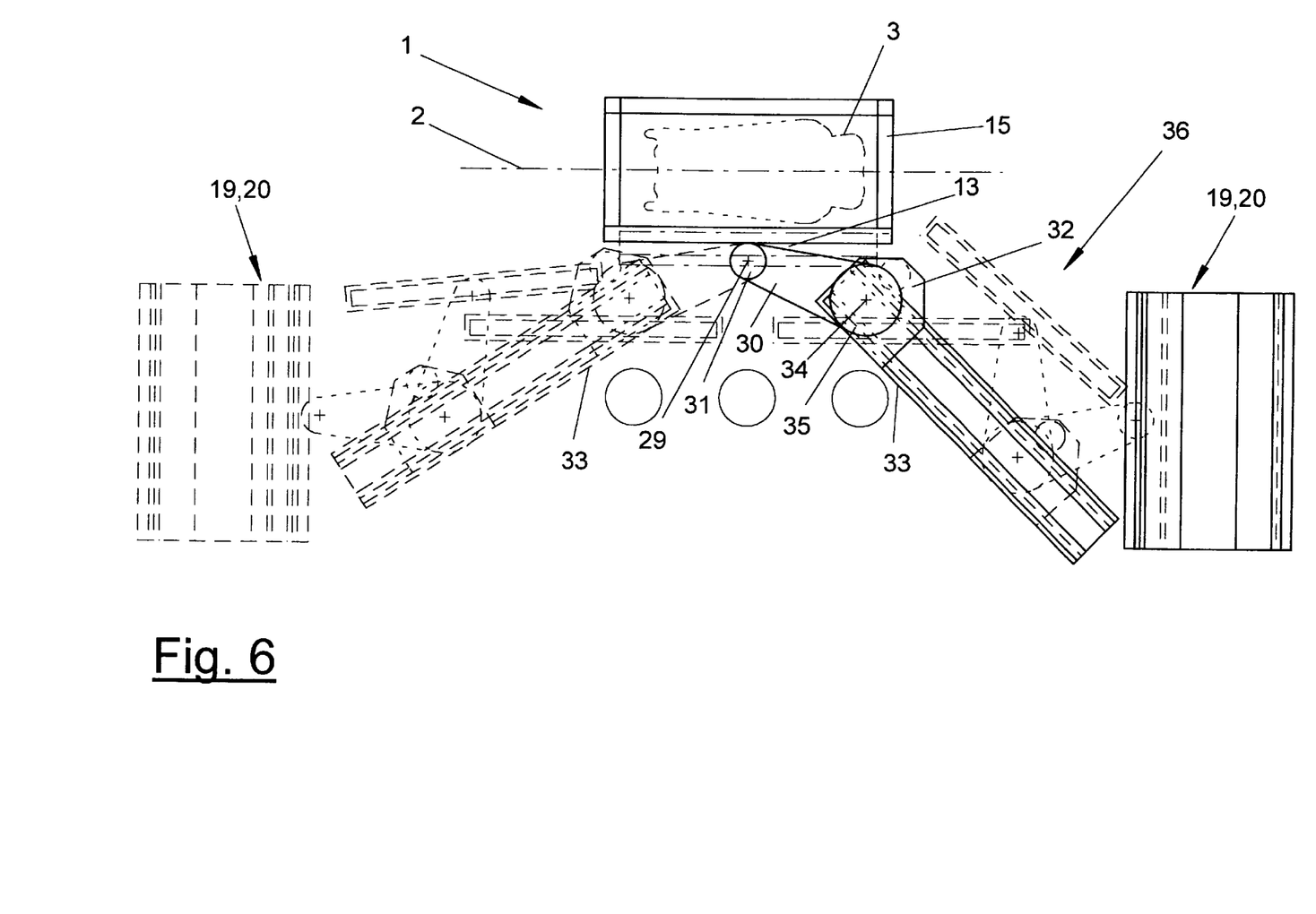
FIG. 6 is a schematic top view of an arrangement for moving clamping frames in another variant.

The exemplary embodiment according to FIG. 6, which represents an independent invention, avoids the arrangement of a four-bar chain for moving the holding device 13. A connecting rod 30 with its axis and pivoting drive 31 is mounted and driven rotatably, instead, in the center 29 of the holding device 13, so that the holding device 13 can perform a pivoting movement around this axis (center 29 of the holding device). The other end of the connecting rod 30 is guided via an axis 34 and a pivoting drive 35 on a carriage 32, which is movable along a stationary guide 33. As is shown in FIG. 6, two such guides 33, which open from the center 29 of the holding device 13 in the outwardly direction, are provided for each processing station in the exemplary embodiment. It is thus made possible to bring the connecting rod 30 associated either with one guide 33 or with the other guide 33 with the holding device 13 associated with them into the position in front of the processing station 1.

If needed, waiting positions 19 or clamping frame storage units 20, in which the individual clamping frames 14 can be deposited and from which they can be removed, are provided laterally from the guides 33. The movement necessary for this is derived from the resultant of two pivoting drives 31, 35.

Various modifications of the exemplary embodiments shown are possible. On the one hand, the feed movement of the clamping frames 14 may also be non-linear. Furthermore, two or more connecting rods 10 may be arranged one on top of another rather than next to one another as shown in FIGS. 1 and 2. Moreover, it is possible to arrange the connecting rods laterally in a corresponding frame, in which case they have essentially horizontal pivot axes 11 extending in parallel to the transfer line. They will thus act laterally on the clamping frame 14. Two connecting rods may be arranged next to one another or opposite each other in this variant as well. Moreover, the design variants mentioned may be combined with the others as an alternative to the design and kinematics of the handling device 36 corresponding to the exemplary embodiments 4 through 6.

While specific embodiments of the invention have been shown and described in detail to illustrate the application of the principles of the invention, it will be understood that the invention may be embodied otherwise without departing from such principles.

What is claimed is:

1. A device for handling workpiece components in a processing station with a transfer line, the device comprising:
   a carriage movable along the transfer line;
   a handling device with a rotatably driven connecting rod, which is mounted at one end to said carriage;
   a holding device mounted at another end of said connecting rod;
   a plurality of clamping frames, said holding device separately and replaceably receiving one of the clamping frames, each of said plurality of clamping frames having clamping elements for clamping the workpiece components.

2. A device in accordance with claim 1, wherein in a working position, said clamping frame is guided movably along and at right angles to said transfer line on said stationary frame and centered and braced.

3. A device in accordance with claim 1, wherein detachable clamping connections are provided between said holding device and said clamping frame.

4. A device in accordance with claim 1, further comprising: another carriage a stationary guide a feed drive and a toothed rack wherein said individual carriage is mounted on said stationary guide extending along said transfer line and a feed drive is arranged, via said toothed rack, on said carriage and that said carriage and said another carriage are connected to one another via a coupling rod or each carriage has its own drive without a connection.

5. A device in accordance with claim 1, wherein said connecting rods move said holding device with said clamping frame from the processing station into a clamping frame storage unit and back in a position directed in parallel to the transfer line and said connecting rods can be driven by a pivoting movement directed opposite the approach to the processing station for approaching the storage unit.

6. A device in accordance with claim 1, further comprising:
   a shell arranged in the processing station;
   industrial robots and a stationary guide, said carriage being mounted on said stationary guide extending along said transfer line wherein said connecting rods, said carriage and said guide as well as said holding device are located in planes located laterally from, and located under said shell located in said processing station and said industrial robots installed outside said guide can be moved toward said shell beyond said holding device.

7. A device in accordance with claim 1, wherein said handling device has two connecting rods that are arranged in a four-bar chain arrangement and are rotatable around parallel axes.

8. A device in accordance with claim 7, further comprising a feed drive and a pivoting drive wherein said holding device holds the clamping frame, which itself is arranged upright, in an articulated manner and said feed drive of said carriage and said pivoting drive of said connecting rods are controlled such that the resultant of the two movements leads to an essentially linear adjustment of said holding device at right angles to the transfer line.

9. A device in accordance with claim 8, wherein individual said connecting rods are designed as an articulated arm in the manner of a toggle lever and an additional pivoting drive for a free leg of said articulated arm is arranged in said toggle link such that both said pivoting drives are controlled such that said holding device articulated to said free leg performs a linear movement at right angles to said transfer line.

10. A device in accordance with claim 8, wherein:
    a vehicle shell is movable along said transfer line;
    each of the workpiece components are a side part connectable to said vehicle shell;
    each of said clamping frames reusably holds one of said workpiece components;
    said carriage directs said clamping frames along the transfer line;
    said connecting rods are rotatably connected to said carriage about respective pivot axes;
    said pivoting drive of said connecting rods is arranged at one of said pivot axes;
    said pivot axes are substantially vertical.

11. A device in accordance with claim 10, wherein:
    said carriage, said handling device and said holding device are arranged on one side of the transfer line;
    another carriage, another handling device and another holding device are arranged on another side of the transfer line.

12. A device for handling at least one clamping frame, with which at least one workpiece can be brought into a geometrically accurate assembly position in a processing station in within a transfer line for manufacturing the shell of a vehicle, the device comprising:
    a stationary guide;
    a carriage moving along the stationary guide;
    a clamping frame guided movably both along and at right angles to said transfer line;
    a holding device;
    a connecting rod with a pivoting drive acting on said holding device articulated in a center of said holding device located at the processing station and carrying said clamping frame, another end of said connecting rod being mounted in an articulated manner with respect to said carriage that is movable along said stationary guide and being connected to another pivoting drive.

13. A device in accordance with claim 12, wherein two guides, which form an acute angle with one another and expand in the outward direction, are arranged in a stationary manner next to the processing station.

14. A device in accordance with claim 13, further comprising a storage unit for the clamping frames, said storage unit being arranged on an outside next to said individual stationary drive.

15. An assembly line arrangement comprising:

a transfer line;

a carriage movable substantially parallel to said transfer line;

a handling device including a connecting rod having a first end rotatably connected to said carriage, said connecting rod having a second end, said handling device including a connecting rod motor for rotatably moving said second end of said connecting rod with respect to said carriage;

a holding device connected to said second end of said handling device;

a plurality of clamping frames, each of said plurality of clamping frames being separately connectable to said holding device.

16. An assembly line arrangement in accordance with claim 15, wherein:

said carriage, said handling device and said holding device are arranged on one side of said transfer line;

another carriage, another handling device and another holding device are arranged on another side of said transfer line.

17. An assembly line arrangement in accordance with claim 15, wherein:

an initial component is movable along said transfer line;

a plurality of additional workpieces are provided, each of said additional workpieces being separately connectable to said initial component;

each of said plurality of clamping frames reusably holds one of said additional workpieces.

18. An assembly line arrangement in accordance with claim 17, wherein:

said carriage includes a carriage motor movable of said carriage along said transfer line, said carriage motor and said connecting rod motor cooperate to move said holding device with one of said clamping frames toward and away from said initial component in a direction substantially perpendicular to said transfer line.

19. An assembly line arrangement in accordance with claim 17, wherein:

said carriage includes a carriage motor movable of said carriage along said transfer line, said carriage motor and said connecting rod motor cooperate to move said holding device with one of said clamping frames toward and away from said initial component.

20. An assembly line arrangement in accordance with claim 17, wherein:

said holding device holds said clamping frames in a vertically upright position;

said connecting rod is rotatably connected to said carriage about a pivot axis;

said connecting rod motor of said connecting rods is arranged at said pivot axis;

said pivot axis is substantially vertical;

said carriage is arranged at a vertical distance below said initial component.

\* \* \* \* \*